(12) United States Patent
Baumert et al.

(10) Patent No.: US 10,935,318 B2
(45) Date of Patent: Mar. 2, 2021

(54) METHOD AND SYSTEM FOR DETERMINING THE MASS OF FEEDSTOCK ON A CONVEYOR

(71) Applicant: ARCELORMITTAL, Luxembourg (LU)

(72) Inventors: Jean-Claude Baumert, Howald (LU); Jean-Claude Thibaut, Clemency (BE); Marco Picco, Frisange (LU)

(73) Assignee: ARCELORMITTAL, Luxembourg (LU)

( * ) Notice: Subject to any disclaimer, the term of this patent is extended or adjusted under 35 U.S.C. 154(b) by 262 days.

(21) Appl. No.: 16/064,216

(22) PCT Filed: Dec. 16, 2016

(86) PCT No.: PCT/IB2016/057719
§ 371 (c)(1),
(2) Date: Jun. 20, 2018

(87) PCT Pub. No.: WO2017/109657
PCT Pub. Date: Jun. 29, 2017

(65) Prior Publication Data
US 2019/0011183 A1    Jan. 10, 2019

(30) Foreign Application Priority Data
Dec. 16, 2016  (WO) ............... PCT/IB2015/059871

(51) Int. Cl.
*F27B 3/18* (2006.01)
*C21C 5/56* (2006.01)
(Continued)

(52) U.S. Cl.
CPC ............. *F27B 3/18* (2013.01); *C21C 5/565* (2013.01); *F27B 3/28* (2013.01); *F27D 13/002* (2013.01);
(Continued)

(58) Field of Classification Search
CPC .... F27B 3/18; F27B 3/28; F27D 19/00; F27D 13/002
(Continued)

(56) References Cited

U.S. PATENT DOCUMENTS 5,184,733 A    2/1993  Arnarson
6,004,504 A    12/1999 Vallomy
(Continued)

FOREIGN PATENT DOCUMENTS

CN    101126698 A    2/2008
CN    102884552 A    1/2013
(Continued)

OTHER PUBLICATIONS

International Search Report of PCT/IB2016/057719, dated Mar. 16, 2017.

*Primary Examiner* — Thien S Tran
(74) *Attorney, Agent, or Firm* — Davidson, Davidson & Kappel (57) ABSTRACT

A method and a system for determining a mass of feedstock discharged by a conveyor during a first time interval Δt are disclosed. The method includes taking successive digital images of the feedstock in a specific zone of the conveyor being separated by a second time interval δt of smaller duration than the first time interval Δt, for each of the second time intervals δt: computing the advancing distance of a sub-volume of feedstock during the second time interval δt in the specific zone of the conveyor by numerical treatment of the two successive images associated with the second time interval δt; determining at least one transversal height profile of the sub-volume of feedstock; and determining an effective feedstock density for the sub-volume of feedstock. The method further includes computing the mass of feedstock discharged by the conveyor during the first time interval Δt into the metallurgical furnace on the basis of the (Continued)

advancing distance, the at least one transversal height profile and the effective feedstock density, computed or determined for each of the second time intervals δt.

20 Claims, 4 Drawing Sheets

(51) Int. Cl.
    *F27B 3/28*     (2006.01)
    *F27D 13/00*     (2006.01)
    *F27D 19/00*     (2006.01)
    *F27D 21/02*     (2006.01)

(52) U.S. Cl.
    CPC .............. *F27D 19/00* (2013.01); *F27D 21/02* (2013.01); *F27D 2019/0096* (2013.01); *F27D 2021/026* (2013.01); *Y02P 10/20* (2015.11)

(58) Field of Classification Search
    USPC ........................ 399/27, 53, 96, 267, 273, 313
    See application file for complete search history.

(56) References Cited

U.S. PATENT DOCUMENTS

| | | |
|---|---|---|
| 7,032,744 B1 | 4/2006 | Pietsch |
| 2008/0031489 A1 | 2/2008 | Reinholt et al. |
| 2008/0192987 A1 | 8/2008 | Helason et al. |
| 2013/0058539 A1 | 3/2013 | Mori et al. |
| 2013/0211581 A1* | 8/2013 | Assante ................. B65G 43/08 700/230 |
| 2013/0229501 A1 | 9/2013 | Killmann |
| 2013/0229510 A1* | 9/2013 | Killmann .............. B07C 5/3416 348/91 |
| 2015/0021103 A1 | 1/2015 | Tamai et al. |
| 2015/0060238 A1* | 3/2015 | Luca ...................... B65G 27/30 198/770 |
| 2015/0139267 A1 | 5/2015 | Della Vedova et al. |

FOREIGN PATENT DOCUMENTS

| | | |
|---|---|---|
| CN | 103308127 B | 4/2015 |
| CN | 104487811 A | 4/2015 |
| DE | 19631926 | 2/1998 |
| EP | 2606305 A1 | 6/2013 |
| EP | 2643103 A1 | 10/2013 |
| JP | H 05-164677 A | 6/1993 |
| JP | 2002-005637 A | 1/2002 |
| JP | 2008-512672 A | 4/2008 |
| JP | 2010-066127 A | 3/2010 |
| JP | 2015-507093 A | 3/2015 |
| JP | 2015-111088 A | 6/2015 |
| KR | 101363370 B | 2/2014 |
| RU | 2266856 C2 | 12/2005 |
| RU | 2398896 C2 | 9/2010 |
| WO | 2006027802 A1 | 3/2006 |
| WO | 2012023029 A1 | 2/2012 |

\* cited by examiner

METHOD AND SYSTEM FOR DETERMINING THE MASS OF FEEDSTOCK ON A CONVEYOR

FIELD OF THE INVENTION

The invention generally relates to a method and a system for charging a metallurgical furnace, e.g., an electric arc furnace, with (steel) scrap and/or other feedstock, such as, e.g., direct-reduced iron (DRI, also called sponge iron) or, possibly, pig iron. More specifically, the invention relates to a system and a method for determining the amount of feedstock that is supplied by a conveyor into a metallurgical furnace.

BACKGROUND OF THE INVENTION

The technology of metallurgical furnaces charged with feedstock, e.g. scrap, in a continuous or a discontinuous way is well established.

Patent EP2606305 describes a system for controlling and tracking the charge of material transported by a continuous supply conveyor of a metallurgical furnace. The system comprises a loading section for charging a previously determined weight of material, according to a predetermined charge recipe, on the continuous supply conveyor. The system marks the charge through identification means. The overall dimensions of the loaded charge are detected and the advancing speed of the loaded charge is computed. EP2606305 describes that the means for detecting the advancing speed may comprise means for acquiring a plurality of images of charges in delayed times, the images and the relative acquisition times being then mutually correlated and processed. The system of EP2606305 determines the weight of each charge fraction only once, at the respective loading station and before the charge fraction is discharged onto the conveyor. Finally, the system determines the arrival time of the charge into the furnace.

Notwithstanding the above disclosure, determining the mass flow of feedstock entering a metallurgical furnace with satisfactory accuracy remains, in practice, a problem to be solved. Indeed, one of the assumptions underlying the calculations of the system of EP2606305 is that each charge loaded on the conveyor stays together and progresses as one unit. In reality, this is not the case, especially if the conveyor is of the vibrating type. On this type of conveyor, the advancement of the scrap is complicated, if not impossible, to model. For instance, one can observe that different parts of the same charge may progress at different speeds, depending on a number of factors. Furthermore, after each feeding of the furnace, charge may remain on the conveyor and will be loaded into the furnace next time. For these reasons, the knowledge of the weights of the charge fractions initially loaded on the conveyor is typically not sufficient to determine how much feedstock is fed to the furnace at an arbitrary time.

SUMMARY OF THE INVENTION

The present invention provides a method for determining a mass of feedstock discharged by a conveyor during a first time interval, hereinafter denoted $\Delta t$, into a metallurgical furnace, e.g. an electric arc (steelmaking) furnace. The method comprises:

taking successive digital images of the feedstock in a specific zone of the conveyor, two successive images being separated by a second time interval, hereinafter denoted $\delta t$, that is of smaller duration than the first time interval $\Delta t$ ($\delta t \leq \Delta t$);

for each of the second time intervals $\delta t$:
  computing the advancing distance of a sub-volume of feedstock during the second time interval $\delta t$ in the specific zone of the conveyor by numerical processing of the two successive images associated with the second time interval $\delta t$;
  determining at least one transversal height profile of the sub-volume of feedstock;
  determining an effective feedstock density for the sub-volume of feedstock; and computing the mass of feedstock discharged by the conveyor during the first time interval $\Delta t$ into the furnace on the basis of the advancing distance, the at least one transversal height profile and the effective feedstock density, computed or determined for each of the second time intervals $\delta t$.

As used herein, the expression "feedstock" designates solid material to be charged into the furnace. For instance, in case of an electric arc furnace for steel production, the feedstock is iron-containing material and encompasses, in particular (steel) scrap and DRI. It may be worthwhile noting that EP2606305 relies on the knowledge of the initially measured weights of the different charge fractions and remains silent on any subsequent computation of the mass of feedstock.

Preferably, the method comprises computing the advancing speed of the sub-volume of feedstock on the conveyor and/or the arrival time of the sub-volume of feedstock at the furnace.

It will be appreciated that the method according to the invention extracts the advancing distance of the feedstock (for each second time interval $\delta t$) from the digital images taken with the camera. The mass of feedstock passing through the specific zone of the conveyor in a given second time interval allows the system to derive when that mass will arrive at the entrance of the furnace and be discharged therein. The system may thus keep track of the charge of the furnace and also anticipate the future charge some time in advance. The forecasting horizon depends on the distance between the specific zone of the conveyor, where the measurements are made, and the entrance into the furnace, as well as on the advancing speed of the feedstock. As the advancing speed may vary, the forecasting horizon may vary as well. Nevertheless, that time may be used for adjusting the operating parameters of the furnace in such a way as to optimize its efficiency (in terms of capacity and/or power consumption and/or operating costs).

As used herein, a "time interval" is a period having a start time, an end time, and a duration (the difference between the start and end times). In the expressions "first time interval" and "second time interval", ordinal numerals "first" and "second" are only used for distinguishing both type of time intervals and are not meant to imply any hierarchy or order in time. In fact, as mentioned above, the method according to the invention may be one of predicting the mass of feedstock discharged by a conveyor during a future first time interval.

It may be worthwhile noting that the duration of neither the first time interval $\Delta t$ nor of the second time interval $\delta t$ need be fixed, although that may be preferred for simplicity. Indeed, both durations $\Delta t$ and $\delta t$ could be dynamically adjusted.

The duration of the second time interval could be the time between two consecutive images of the camera or an integer multiple thereof (in which case the above-mentioned two successive images are not nearest neighbors in the sequence of images shot by the camera). The duration of the second time interval could be changed by selecting how many images are discarded after every image that is kept for numerical processing. If the frame rate of the camera is adjustable, the duration of the second time interval could be adjusted via variation of the frame rate.

Preferably, computing the mass of feedstock discharged during the first time interval Δt comprises:

for each second time interval δt, computing the mass of a sub-volume of feedstock on the basis of the advancing distance, the at least one transversal height profile and the effective feedstock density determined; and summing up the masses of the sub-volumes of feedstock arriving at the furnace during the first time interval Δt.

The method preferably comprises a numerical analysis of digital images taken of the feedstock in the specific zone of the conveyor, e.g. during the respective second time interval δt, in order to determine a particle size distribution (granulometry) of the feedstock.

The effective feedstock density in each sub-volume may be determined on the basis of the particle size distribution of the feedstock. The effective feedstock density in the sub-volume may e.g. be determined on the basis of the particle size distribution of the feedstock determined by optical granulometry and using a look-up table in which effective feedstock densities are correlated to feedstock particle size distributions. As an alternative, the method could use a classifier trained to assign an effective feedstock density to each sub-volume of feedstock based upon the corresponding digital image(s). The digital images taken in the specific zone of the conveyor are preferably used as the basis for particle size distribution by optical granulometry measurement.

The duration of the second time intervals δt may be dynamically adjusted on the basis of the particle size distribution of the feedstock. A problem with fine shredded feedstock is that, if the second time interval is too long, the surface of the feedstock, as seen by the camera, can change significantly. This is due to the shaking produced by the underlying vibrating transport mechanism. Feedstock particles lying on top of the pile can easily move, covering up other particles, still visible in the previous images. Accordingly, in case of finer feedstock, it may be advantageous to reduce the duration of the second time intervals δt, whereas in case of larger feedstock the duration of the second time intervals δt may be increased.

Preferably, if the images taken by the camera are color images, the numerical processing for computing the advancing distance includes converting the color images to greyscale images. Other image corrections, such as, e.g. cropping, contrast adjustment and/or filtering, may be carried out as well as part of the numerical processing.

The numerical processing for computing the advancing distance preferably comprises selecting a portion of feedstock in one of two successive images; and identifying the corresponding portion of feedstock in the other one of the two successive images. The portion of feedstock that is selected is preferably contained in a delimited region (e.g. a region of interest) of the one of the two successive images. The region of interest containing the selected feedstock portion may be rectangular or round or of any other suitable shape. The region of interest may have a fixed size and position within the image. Alternatively, the region of interest could be dynamically adjusted depending on the content of the image, i.e. the feedstock currently being photographed. Identification of the selected portion of feedstock in the other of the two successive images may e.g. be done by cross-correlation between the region of interest in the first image and the second image. When the position of the portion of feedstock in the other one of the two successive images has been found (by cross-correlation or in any other suitable way, e.g. image registration or feature detection), the advancing distance of that portion of feedstock is known in units of camera pixels. By correctly scaling of the distance (in the direction of travel) and dividing by the time interval between the two pictures, the advancing speed of the feedstock is easily calculated. Another option would be to select one or more individual pieces of feedstock, e.g. in different regions of the one image, and to identify these pieces in the other image. If it is determined that the individual pieces moved by different distances, the average of these distances could be used as the advancing distance of the feedstock.

Scaling the advancing distance and/or the advancing speed of the feedstock is preferably carried out on the basis of the distance between the camera and the (portion of) feedstock currently being considered for computation of the advancing distance and/or the advancing speed. That distance (hereinafter called "line-of-sight" distance) may be inferred from the transversal height profile corresponding to the feedstock imaged by the camera. The scaling factor that converts the advancing distance from units of pixels into units of length depends on the line-of-sight distance. Dynamic scaling is preferred and may even be necessary in order to achieve the desired accuracy in the advancing distance and/or advancing speed calculations if the variations in the height profiles are significant in comparison to the line-of-sight distance. However, if the height level of the feedstock on the conveyor is more or less constant, an average scaling factor may suffice to determine the correct shift between the images under consideration, and consequently, calculate the correct advancing distance or speed of the feedstock.

According to an embodiment of the method, the selection of the portion of feedstock in one of the two successive images comprises optically determining the particle size distribution of the feedstock across the image; and selecting the portion of feedstock depending upon the particle size distribution. Preferably, the system selects a portion of feedstock whose particle size distribution allows for good cross-correlation. For instance, image regions containing only small feedstock pieces may lead to unsatisfactory identification results in the second image. If dynamical selection is implemented, regions with somewhat larger pieces of feedstock may be preferred. Another criterion for dynamically selecting a portion of feedstock may be the position thereof in the image: any portion of feedstock likely not to appear in the other image due to its movement will not be selected. Selecting a portion of feedstock in one of the two successive images may comprise, alternatively or additionally, analyzing the content of one of the images using one or more criteria different from particle size distribution (e.g. distribution of bright and dark areas, presence of recognizable edges, etc.) and then selecting the portion of feedstock depending on the outcome of this analysis.

The method according to the invention is especially well suited in combination with an oscillating-type (or vibrating-type) conveyor. That finding is surprising, since the motion of feedstock on an oscillating conveyor is not a translation. Indeed, as the feedstock moves forward, there is significant relative movement between the pieces of feedstock. As each piece of feedstock follows its own, individual, trajectory, it could not be anticipated that optical detection of the advancing distance (or the advancing speed) would be possible with a reasonable computational time while producing useful results. Surprisingly, however, that turned out to be the case when correlation-based pattern recognition was used for the detection of the advancing distance.

The present invention further provides a system for determining a mass of feedstock discharged by a conveyor during a first time interval $\Delta t$ into a metallurgical furnace, e.g. an electric arc furnace. The system comprises:
- one or more cameras configured and arranged for taking successive images of the feedstock in a specific zone of the conveyor, two successive images being separated by a second time interval $\delta t \leq \Delta t$;
- at least one laser scanner or range camera (e.g. a 3-D time-of-flight camera) for determining at least one transversal height profile of a sub-volume of feedstock in the specific zone;
- a data processing system configured for:
  - computing, for each second time interval $\delta t$, the advancing distance of the respective sub-volume of feedstock during the second time interval $\delta t$ by numerical processing of the two successive images associated with the second time interval $\delta t$; and
  - computing the mass of feedstock discharged by the conveyor during the first time interval $\Delta t$ into the furnace on the basis of the advancing distance, the at least one transversal height profile and the effective feedstock density, computed, determined or fixed for each of the second time intervals $\delta t$.

The system may comprise at least one lighting module for illuminating the field of view of the one or more cameras, so as to allow sufficiently short exposure times, to reduce the signal-to-noise ratio, and to enhance the contrast of the images.

Preferably, the one or more cameras are placed above the conveyor, at a distance from the conveyor selected so as to ensure sufficient image resolution. For instance a distance of the one or more cameras from the conveyor comprised between one and three times the transversal width of the conveyor may be suitable in case the one or more camera are equipped with standard optics.

The system is preferably configured to carry out the method according to the invention and is particularly suited for metallurgical, e.g. electric arc, furnaces equipped with a "continuous" charging installation.

The present invention also provides a method for operating a metallurgical furnace (e.g. an electric arc furnace), into which feedstock is discharged by conveyor. This method comprises:
- predicting the mass of feedstock discharged into the furnace during a first time interval $\Delta t$ using another method of the invention, and
- modifying operating parameters of the furnace based upon the predicted mass of feedstock; and/or
- modifying the mass flow of the feedstock discharged into the furnace based upon target operating parameters of the furnace.

The furnace operating method thus uses the predictions to control, either manually or automatically, operation of the furnace and/or to correct the (continuous) charging process. Preferably, both type of regulations are combined in order to operate the furnace in an optimal regime.

BRIEF DESCRIPTION OF THE DRAWINGS

The accompanying drawings illustrate several aspects of the present invention and, together with the detailed description, serve to explain the principles thereof. In the drawings.

DETAILED DESCRIPTION A PREFERRED EMBODIMENT

FIGS. 1 to 5 depict aspects of a simplified system 10 for charging a steelmaking electric arc furnace 16. The charging system 10 comprises a loading station 12 depositing feedstock, in particular, scrap, on a conveyor 14. The conveyor 14 is of oscillating type, which is best suited for transporting the feedstock due to its non-clogging and self-cleaning properties.

Figure 1:
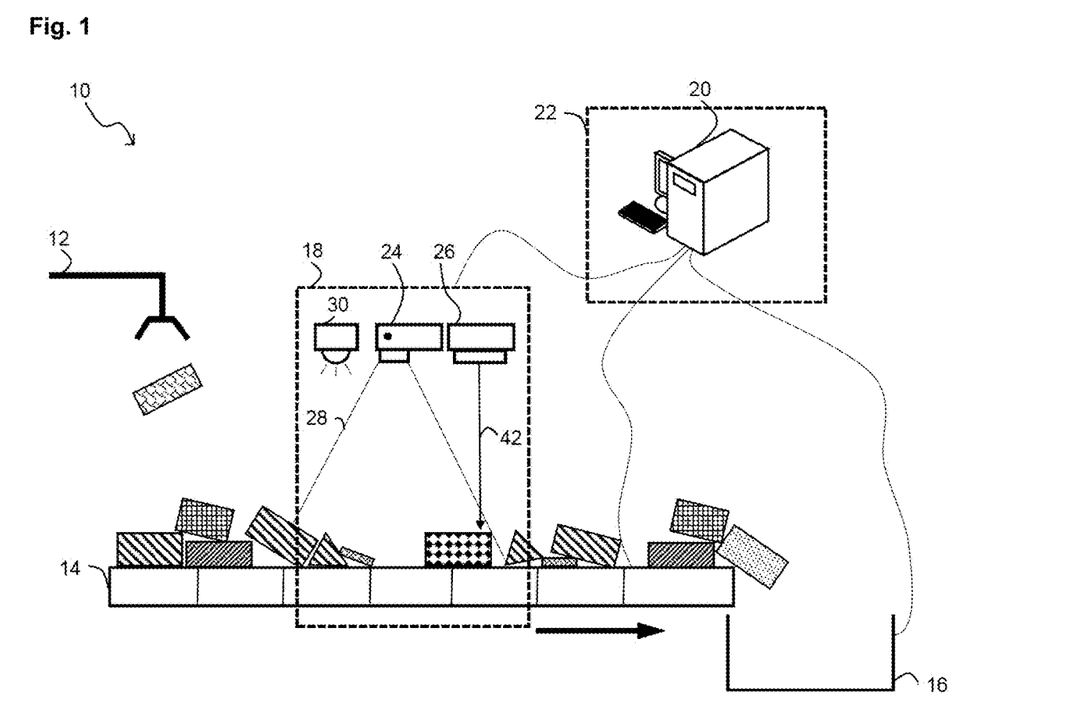
FIG. 1: is a schematic view of a charging mechanism of an electric arc furnace for steelmaking.

During transport towards the furnace 16 on the conveyor 14, the feedstock passes through a feedstock-characterization station 18. Feedstock-characterization station 18 is connected to a processor 20. The processor 20 transmits information about the feedstock to a control center 22. Based upon the information received from the feedstock-characterization station 18, the controller in the control center 22 may modify the operating parameters of the electric arc furnace 16 and/or modulate the future mass flow of the feedstock. Both measures serve to drive the electric arc furnace 16 as efficiently as possible.

The feedstock loading station 12 typically comprises a crane hoist or similar installation, in which the amount of feedstock loaded on the conveyor 14 is not, or at least not precisely, controlled. Therefore, the mass of feedstock discharged into the electric arc furnace 16 during a time interval $\Delta t$ cannot be determined solely relying upon information from the feedstock loading station 12, if any. Moreover, the shape, the size, as well as the aspect ratio of the feedstock parts can significantly change over time.

The feedstock-characterization station 18 serves the purpose of optically determining the advancing speed and the distribution of mass of feedstock in the longitudinal direction of the conveyor 14. The feedstock-characterization station 18 is located between the loading station 12 and the electric arc furnace 16 and has as main components a digital camera 24 and a laser scanner 26 fixed above the conveyor 14, at a distance from the conveyor 14 preferably comprised between one and three times the conveyor's 14 transversal width. For a conveyor 14 with a transversal width of 2 m, the camera 24 and the laser scanner 26 may e.g. be fixed between 2 and 6 m above the conveyor 14.

The digital camera 24 takes digital images of the feedstock at a frame rate preferably comprised in the range from 1 Hz to 30 Hz passing the feedstock characterization station 18. The field of view 28 of the camera 24 covers the full width of the conveyor 14 and a section of the conveyor 14 in the longitudinal direction thereof. As an example, the zone covered by the camera 24 could be 2 meters by 2 meters conveyor 14 in size. The feedstock-characterization station 18 further comprises a lighting module 30, for example comprising LEDs, for illuminating the field of view 28 of the camera 24.

There are no specific requirements regarding the type of the camera 24, except that it is preferably a rugged camera configured to withstand the environmental conditions to which it is exposed.

The images taken by the camera 24 are processed to extract the advancing speed of the feedstock, the particle size distribution and the effective density of the feedstock.

Figure 2:
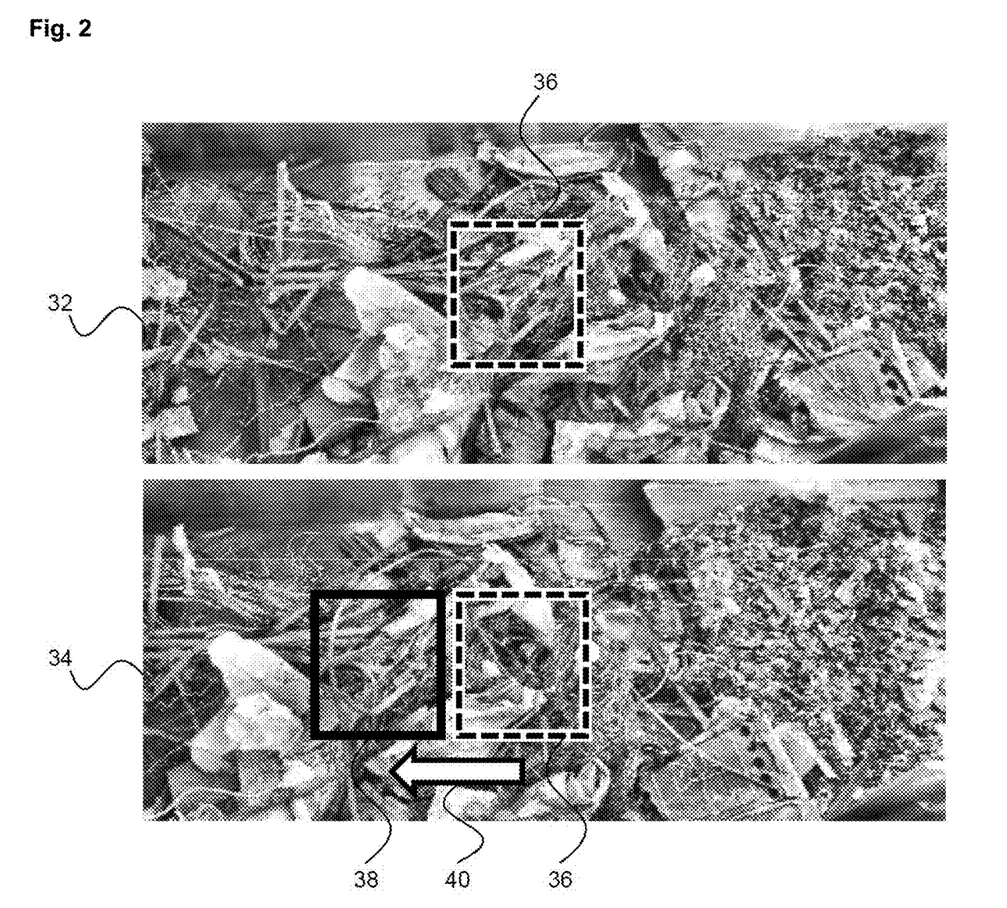
FIG. 2: contains two images taken at different times by a camera, showing the motion of the feedstock on a conveyor.

Extraction of the advancing speed is based on the so-called 'image registration' technique. Two images 32, 34 are selected in the image sequence delivered by the camera 24. The images 32, 34 can be directly successive images but that is not necessarily preferred, especially if the camera 24 has a high frame rate. The time interval δt between these images 32-34 is chosen sufficiently small, so that at least part of the feedstock is present in both images 32, 34, although at different locations. In one of the images 32, a so-called 'template' 36 (sub-image, or region of interest) containing a portion of the feedstock is chosen, and the processor 20 tries to find the same portion of feedstock 38 in the second image 34. In the second image 34, the portion of feedstock has moved by a certain distance 40 with respect to the first image 32. Identifying the feedstock portion in the second image 34 is performed by 2-D cross-correlating the template 36 with the second image. Identification is deemed achieved in the area in which the cross-correlation function reaches its maximum. The distance, in pixels, between the template 36 and the area in the second image 38 corresponds to the advancing distance 40 of the feedstock in the time interval δt. The conversion from the advancing distance 40 in pixels into the actual advancing distance 40 (e.g. in metric units) is carried out based upon a previously made calibration of the camera 24. By dividing the advancing distance 40 by the time interval between the two pictures 32, 34, the translation speed is obtained.

The processor 20 is preferably configured to extract the advancing speed entirely automatically. The algorithm may comprise some image pre-processing, in particular in order to deal with the highly variable aspects of the feedstock: type (scrap or DRI), size, shape, color (clean to completely oxidized).

A first pre-processing step may comprise cropping the images, in order to remove border areas with no useful information.

In case the camera 24 takes color images, a pre-processing step comprising the conversion of the color images into greyscale images may be carried out. This step does not reduce, or at least does not significantly reduce, the amount of information present in the image but significantly reduces the computational costs of the cross-correlations.

A high contrast of the images is useful for detecting more robustly maximal cross-correlation. For this purpose, the processor 20 applies an adaptive histogram equalization routine for increasing the contrast of the image.

For each image, the granulometry (particle size distribution) of the feedstock parts can be obtained using the so-called 'morphological image opening' technique. This technique corresponds to passing a mask over the image consisting of a structuring element (an opening circular disk of variable diameter (in pixels), or of other shape) and counting the number of pixels related to the contours of the imaged feedstock pieces, which pass through this variable size structuring element. This technique can also be referred to as 'optical sifting'. The information on feedstock granulometry may be used by the processor 20 to dynamically adjust the size (and possibly the shape) of the template 36 to be tracked. Typically, larger feedstock pieces require a larger template than smaller ones for good displacement detection.

Furthermore, this granulometry data can be used to give to the furnace operator information a more 'objective' information on what type, or grade, of feedstock is currently been transported on the conveyor.

Other optical granulometry techniques could be used. Nevertheless, the 'image opening' technique is particularly well suited since cross-correlation is preferably carried out on images obtained by the filtering obtained according to the 'morphological image opening' technique. Those filtered images contain only features having a diameter (greatest extension) within a certain range.

The laser scanner 26 is configured and arranged for scanning 42 the feedstock in a plane perpendicular (transversal) to the motion of the feedstock. The scan 42 provides at least one height profile 44 of the sub-volume of feedstock located passing through the feedstock-characterization station 18. Height profiles 44 that are recorded successively may be combined to yield a 3-D representation of the feedstock surface of the sub-volume. An example of such a 3-D representation of a sub-volume of the feedstock conveyor 14 is provided in FIG. 5. Instead of a linear laser scanner (recording individual slices of a scene), the feedstock-characterization station 18 could alternatively comprise a 3-D laser scanner or a 3-D time-of-flight camera.

Based upon the particle size distribution determined optically, the processor 20 determines the effective density of the feedstock. Using that information in combination with the height profiles 44, the masses of the sub-volumes of feedstock may be calculated.

Figure 3:
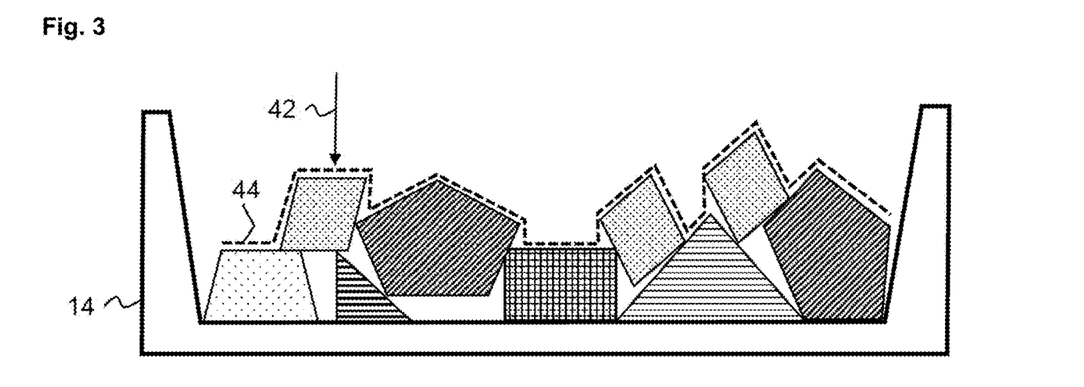
FIG. 3: is a schematic cross-sectional view of feedstock composed large pieces, on a conveyor.
Figure 4:
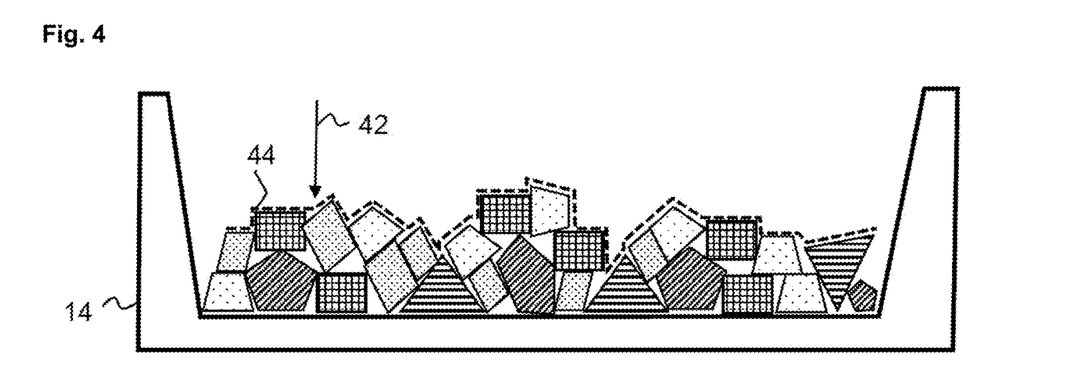
FIG. 4: is a schematic cross-sectional view of feedstock composed of smaller pieces, on a conveyor.
Figure 5:
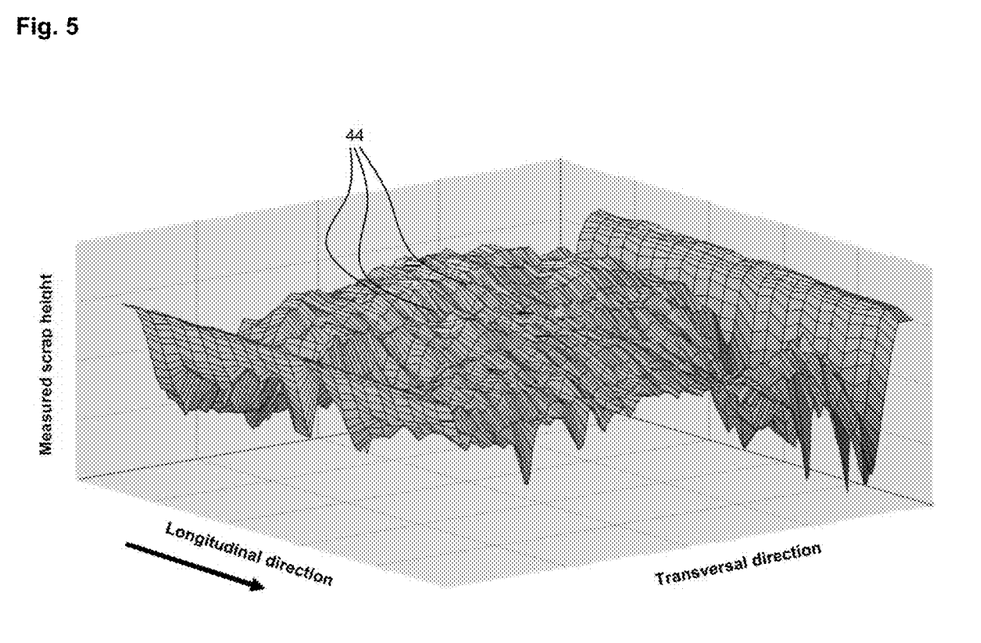
FIG. 5: is a graphical representation of the detected height profiles of the pile of feedstock on the conveyor.

The determination of the mass of a sub-volume of the feedstock requires the knowledge of the apparent volume $V_{app}$ of the sub-volume of feedstock and the effective density $\rho_{eff}$ thereof. In general, the relation between the apparent volume, the effective density, the bulk volume V and the bulk density $\rho$ can be written as $\rho V = \rho_{eff} V_{app}$. The apparent volume $V_{app}$ is known through the at least one height profile 44 measured by the laser scanner 26. For the sake of clarity, two examples are depicted in FIGS. 3 and 4 where the distribution of particle sizes of the feedstock has a high, respectively a low, average particle size while the apparent volume $V_{app}$ of both portions of feedstock is approximately the same. The processor 20 determines the effective density $\rho_{eff}$ of the sub-volume of feedstock using a look-up table in which effective feedstock densities are correlated to feedstock particle size distributions. In the final step, to determine the mass of a sub-volume of the feedstock, the processor 20 multiplies the effective density $\rho_{eff}$ by the apparent volume $V_{app}$.

While a specific embodiment has been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. A method for determining a mass of feedstock discharged by a conveyor during a first time interval $\Delta t$ into a metallurgical furnace, comprising:

taking digital images of the feedstock in a specific zone of said conveyor, two successive images being separated by a second time interval $\delta t$, with $\delta t \leq \Delta t$;

for each of said second time intervals $\delta t$:

computing an advancing distance of a sub-volume of feedstock during said second time interval $\delta t$ in said specific zone of said conveyor by numerical processing of the two successive images associated with said second time interval δt;

determining at least one transversal height profile of said sub-volume of feedstock; and determining an effective feedstock density for said sub-volume of feedstock; and computing said mass of feedstock discharged by said conveyor during the first time interval Δt into the furnace based on said advancing distance, said at least one transversal height profile and said effective feedstock density, computed or determined for each of said second time intervals δt.

2. The method according to claim 1, wherein computing said mass of feedstock discharged by said conveyor during the first time interval Δt comprises:

for each second time interval δt, computing a mass of the sub-volume of feedstock based on said advancing distance, said at least one transversal height profile and said effective feedstock density determined; and summing up the masses of sub-volumes of feedstock arriving at the furnace during the first time interval Δt.

3. The method according to claim 1, further comprising the step of:

numerically analyzing a digital image taken of the feedstock in said specific zone of said conveyor to determine a particle size distribution of the feedstock.

4. The method according to claim 3, wherein said effective feedstock density in said sub-volume is determined based on said particle size distribution of the feedstock.

5. The method according to claim 4, wherein said effective feedstock density in said sub-volume is determined based on said particle size distribution of the feedstock and using a look-up table in which effective feedstock densities are correlated to feedstock particle size distributions.

6. The method according to claim 4, wherein the duration of said second time intervals δt is dynamically adjusted based on said particle size distribution of the feedstock.

7. The method according to claim 1, wherein said images are color images and said numerical processing for computing the advancing distance includes converting said color images to greyscale images.

8. The method according to claim 1, wherein said numerical processing for computing the advancing distance comprises:

selecting a portion of feedstock in one of said two successive images; and identifying a corresponding portion of feedstock in the other one of said two successive images.

9. The method according to claim 8, wherein selecting a portion of feedstock in one of said two successive images comprises:

determining a particle size distribution of the feedstock in said image; and selecting said portion of feedstock based upon said particle size distribution.

10. The method according to claim 1, wherein an advancing speed of said sub-volume of feedstock on said conveyor is computed.

11. The method according to claim 1, wherein said conveyor is an oscillating type conveyor.

12. The method according to claim 1, further comprising:

scaling the advancing distance or an advancing speed of the feedstock based on a distance between a camera and the feedstock currently being considered in the computing of the advancing distance or the advancing speed.

13. The method according to claim 12, wherein said scaling is carried out dynamically, depending on the at least one transversal height profile.

14. A system for determining a mass of feedstock discharged by a conveyor during a first time interval Δt into a metallurgical furnace, said system comprising:

at least one camera for taking successive images of the feedstock in a specific zone of said conveyor, two successive images being separated by a second time interval δt, with δt≤Δt;

at least one laser scanner or range camera for determining at least one transversal height profile of a sub-volume of feedstock in said specific zone;

a data processor configured for:

computing, for each second time interval δt, an advancing distance of the respective sub-volume of feedstock during said second time interval δt by numerical treatment of the two successive images associated with said second time interval δt; and computing said mass of feedstock discharged by said conveyor during said first time interval Δt into the furnace based on said advancing distance, said at least one transversal height profile and said effective feedstock density, computed, determined or fixed for each of said second time intervals δt.

15. The system according to claim 14, further comprising at least one lighting module for illuminating a field of view of said at least one camera, to reduce signal to noise ratio and enhance contrast of said successive images.

16. The system according to claim 14, wherein said at least one camera is placed above said conveyor, at a distance between one and three times a transversal width of the conveyor.

17. A method for operating a metallurgical furnace, into which feedstock is discharged by a conveyor, said method comprising:

predicting a mass of feedstock discharged into the furnace during a first time interval Δt in accordance with the method as according to claim 1, modifying operating parameters of said furnace based upon the mass of feedstock discharged in said furnace during said first time interval Δt; or modifying a mass flow of feedstock discharged into said furnace based upon target operating parameters of said furnace.

18. The method according to claim 17, wherein computing said mass of feedstock discharged by said conveyor during the first time interval Δt comprises:

for each second time interval δt, computing a mass of the sub-volume of feedstock based on said advancing distance, said at least one transversal height profile and said effective feedstock density determined; and summing up the masses of sub-volumes of feedstock arriving at the furnace during the first time interval Δt.

19. The method according to claim 17, further comprising:

numerically analyzing a digital image taken of the feedstock in said specific zone of said conveyor to determine a particle size distribution of the feedstock.

20. The method according to claim 19, wherein said effective feedstock density in said sub-volume is determined based on said particle size distribution of the feedstock or wherein said effective feedstock density in said sub-volume is determined based on particle size distribution of the feedstock and using a look-up table in which effective feedstock densities are correlated to feedstock particle size distributions.

* * * * *